Aug. 21, 1951

A. M. LANE 2,565,242

FLOW CONTROL CIRCUIT

Filed June 18, 1945

*INVENTOR.*
ALBERT M. LANE

BY
*Ralph L. Tweedale*

ATTORNEY

Aug. 21, 1951 A. M. LANE 2,565,242
FLOW CONTROL CIRCUIT
Filed June 18, 1945 2 Sheets-Sheet 2
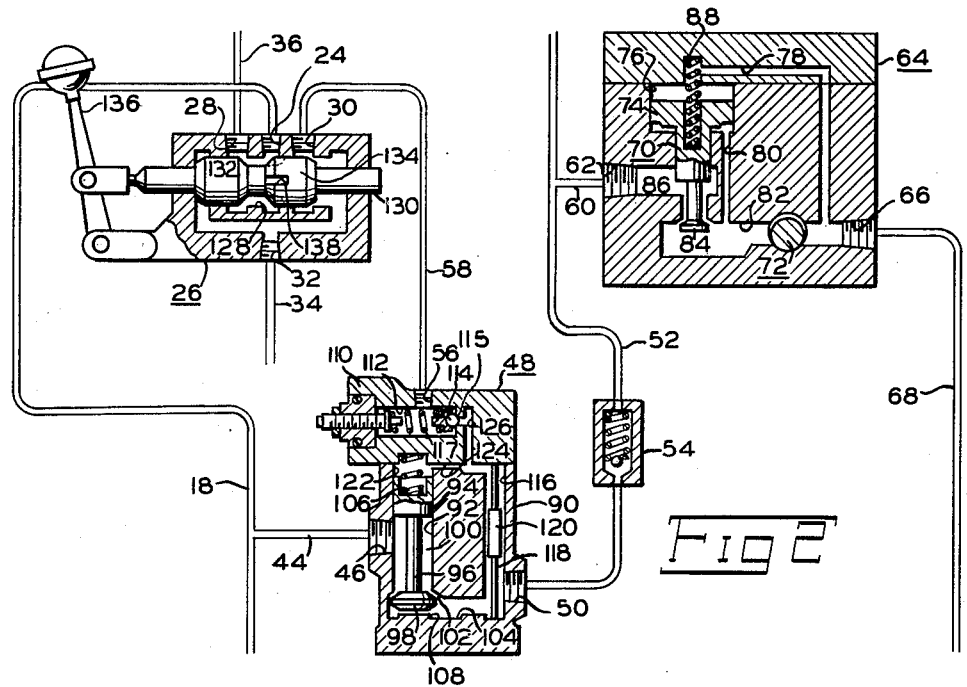
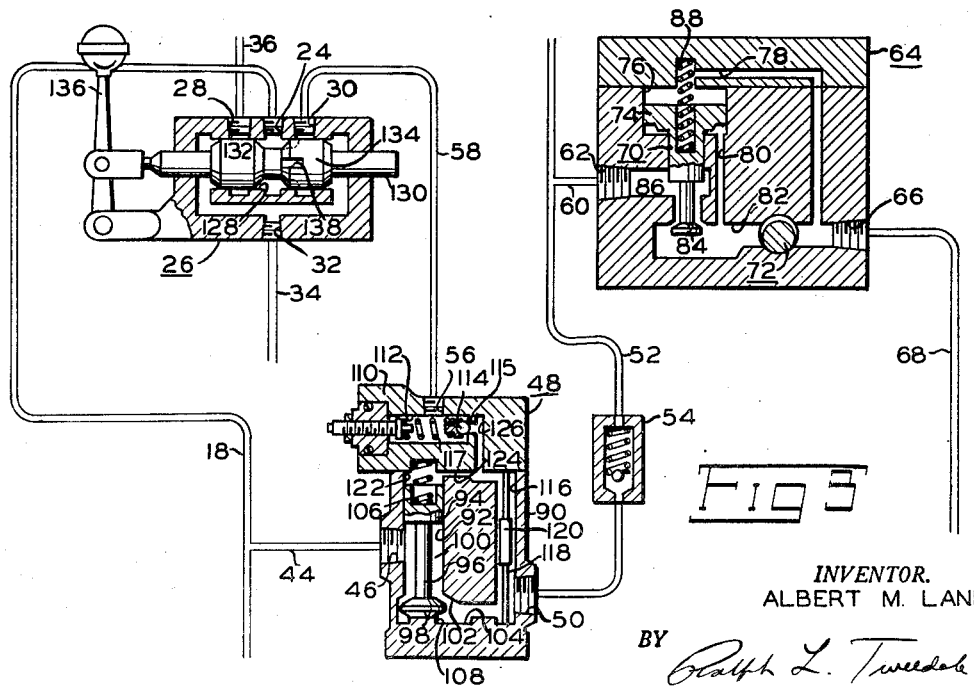
INVENTOR.
ALBERT M. LANE
BY
Ralph L. Tweedale
ATTORNEY Patented Aug. 21, 1951

2,565,242

UNITED STATES PATENT OFFICE 2,565,242

FLOW-CONTROL CIRCUIT

Albert M. Lane, Detroit, Mich., assignor to Vickers Incorporated, Detroit, Mich., a corporation of Michigan Application June 18, 1945, Serial No. 600,004

13 Claims. (Cl. 60—52)

This invention relates to power transmissions, particularly to those of the type comprising two or more fluid pressure energy translating devices, one of which may function as a pump and another as a fluid motor.

This invention is more particularly concerned with a power transmission system of the type containing a fluid motor and incorporating what is commonly known as a flow-regulating valve for controlling the speed of the motor comprising an adjustable throttle and a compensating valve for maintaining a constant flow across the throttle through which fluid is adapted to flow at a regulated rate regardless of load resistance.

Flow-regulating valves have an important use in hydraulic power transmissions for driving machine tools. They serve the purpose of producing a reduced speed rate of the machine tool, and the machine tool may be driven at a constant regulated rate of speed regardless of load resistance.

In the past some difficulty was presented in preventing motor jump when the motor was started after interruption and in particular when a machine tool slide was moved into a feed position from rest or where there was a resumption of a feed movement after interruption during a slide movement. In many cases, if a feed movement was interrupted and the operator of the machine tool did not back the tool away from the work before resuming a cut, the tool was ruined. This is due to the fact that, when flow through the flow-regulating valve is interrupted, the compensating valve is held to the fully open position by a compensating valve spring. When flow is resumed after interruption, a temporary flow of fluid above the normal regulated rate passes through the open compensating valve before it is able to assume normal regulating position. Although this is only a momentary lapse and the compensating valve almost immediately assumes normal regulating position, this temporary flow of fluid above the normal regulated rate causes the motor to jump slightly before a constant regulated movement begins and ruins a cutting tool.

It is an object of the present invention to provide an improved circuit which overcomes this difficulty.

A further object is to incorporate in a power transmission system, incorporating a flow-regulating valve for controlling the speed of a fluid motor contained in said transmission, a pressure-reducing valve connected into the transmission in such a manner as to cause the compensating valve to be in a normal regulating position when the motor is started in a controlled speed movement, thereby preventing motor jump.

Further objects and advantages of the present invention will be apparent from the following description, reference being had to the accompanying drawings wherein a preferred form of the present invention is clearly shown.

In the drawings:

Figure 2 is a diagrammatic view of a portion of the same hydraulic power transmission system shown in Figure 1 but showing the parts in another position during operation.

Figure 3 is a diagrammatic view of a portion of the same hydraulic power transmission system shown in Figure 1 but showing the parts in still another position during operation.

Figure 1:
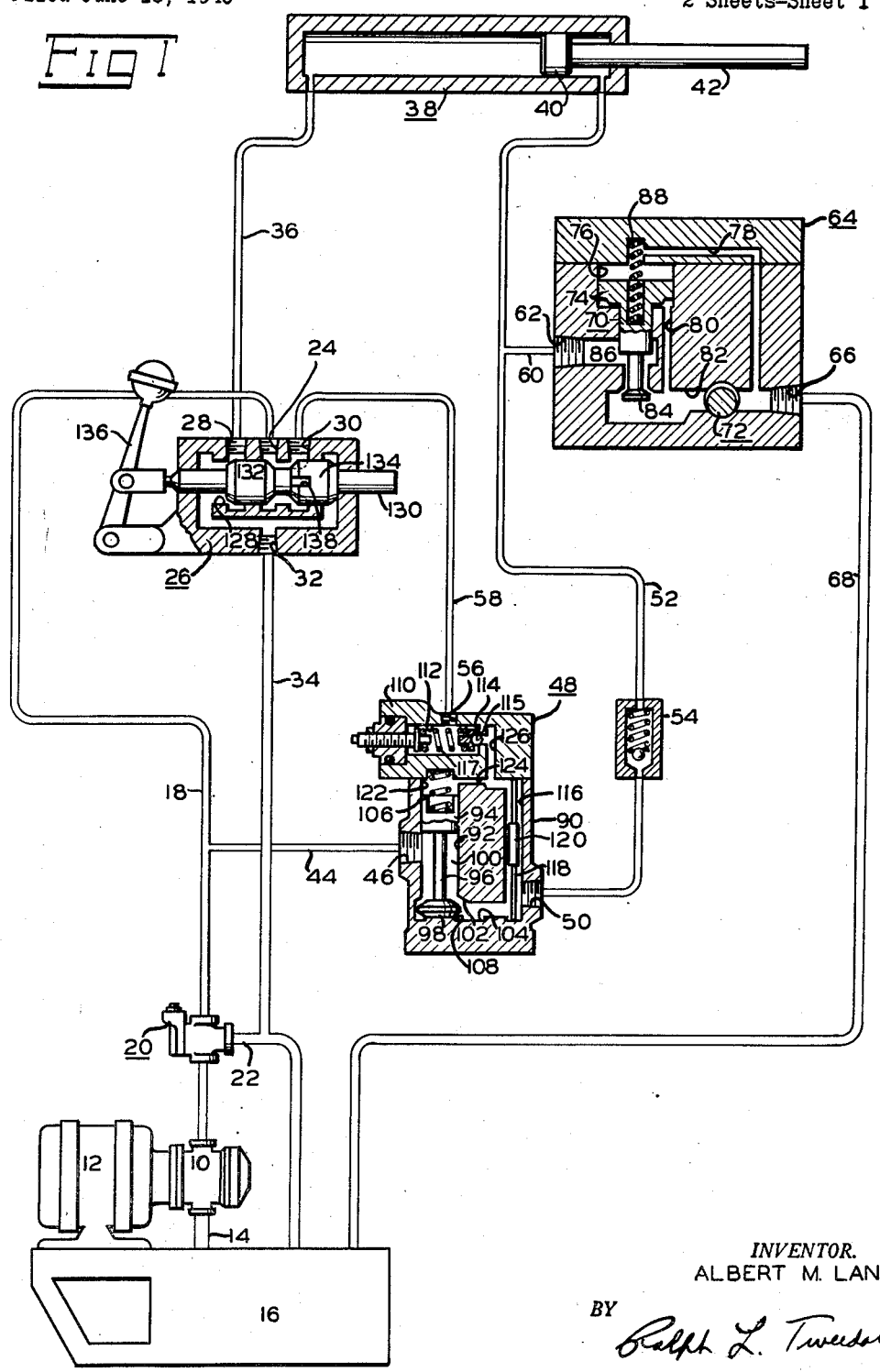
Figure 1 is a diagrammatic view of a power transmission system incorporating a preferred form of the present invention.

Referring now to Figure 1, there is indicated at 10 a pump adapted to be driven by a suitable prime mover, such as an electric motor 12. The pump 10 has a suction conduit 14 for withdrawing fluid from a tank 16 and a delivery conduit 18. Incorporated in pump delivery conduit 18 is a suitable relief valve 20 adapted to pass fluid to tank 16 through an exhaust conduit 22 whenever a predetermined maximum pressure is exceeded in the delivery conduit 18.

Delivery conduit 18 is connected to the pressure port 24 of a suitable four-way directional valve 26 which also has operating ports 28 and 30 and a tank port 32. A conduit 34 connects the tank port 32 of directional valve 26 to tank 16. A conduit 36 connects port 28 of valve 26 to the head end of a motor 38 containing a piston 40 to which is connected a piston rod 42.

A branch conduit 44 of conduit 18 is connected to an inlet port 46 of a pressure-reducing valve 48. An outlet port 50 of valve 48 is connected to the rod end of motor 38 by means of a conduit 52. Incorporated in conduit 52 is a suitable check valve 54 which permits flow in conduit 52 from the outlet port 50 of valve 48 toward the rod end of motor 38 but which prevents reverse flow in conduit 52 toward the outlet port 50 of valve 48. The operating port 30 of directional valve 26 is connected to a drain port 56 of reducing valve 48 by a conduit 58. A branch conduit 60 of conduit 52 is connected to an inlet port 62 of a flow-regulating valve 64 also having an outlet port 66 which is connected to tank 16 by means of a conduit 68.

Flow-regulating valve 64 is comprised of a compensating valve 70 and an adjustable throttle 72, A control piston 74 of compensating valve 70 is mounted in a cylinder 76 from which two passages 78 and 80 extend, one from each end to opposite sides of throttle 72 intersecting a passage 82 in which throttle 72 is mounted. An enlarged bevel portion 84 on the lower end of compensating valve 70 controls communication between passage 82 and a passage 86 which is in communication with inlet port 62. A spring 88 of predetermined resistance mounted in cylinder 76 and abutting control piston 74 normally biases compensating valve 70 to the fully open position when flow through the flow-regulating valve 64 is interrupted.

Pressure-reducing valve 48 is comprised of a housing 90 provided with a longitudinal cylindrical bore 92 in communication with inlet port 46 in which is mounted a reciprocable piston 94. Piston 94 is provided with a stem 96 at the end of which is an enlarged bevel portion 98. An inlet chamber 100 in communication with inlet port 46 is formed in bore 92 between piston 94 and portion 98. A seat 102 is formed in bore 92 at the base of inlet chamber 100. Seat 102 is adapted to cooperate with bevel portion 98 in permitting portion 98 to fully open, partially open or fully close communication between inlet chamber 100 and a passage 104 which is in communication with outlet port 50. A spring 106 of predetermined resistance mounted in bore 92 and abutting piston 94 biases portion 98 toward an abutment 108. An end cap 110 bolted to housing 90 contains a cylinder 112 in communication with drain port 56 and in which is mounted a relief valve 114 held on a seat 115 by means of a spring 117 of predetermined resistance. A passageway 116 intersecting passage 104 is provided with a restriction pin 118 having a portion 120 smaller in cross-sectional area than passageway 116. Passageway 116 is in communication with a chamber 122 formed in bore 92 between end cap 110 and piston 94 by means of a passage 124. The effective areas on the underside of piston 94 and the upper side of portion 98 within inlet chamber 100 are equal. Likewise, the effective area on the upper side of piston 94 within chamber 122 is equal to the effective lower area of portion 98. Communication between a passage 126 in end cap 110 which intersects passage 124 and cylinder 112 is controlled by relief valve 114.

Directional valve 26 is provided with a longitudinal bore 128 in which is slidable a spool 130 having lands 132 and 134 which control the ports 24, 28, 30 and 32, all of which are in communication with bore 128. A handle 136 is connected to spool 130 for the purpose of manual movement of valve 26. Land 134 is provided with a plurality of notches 138. With handle 136 shifted to the right as shown in Figure 1, conduit 18 is connected to conduit 58 and conduit 36 to conduit 34. With handle 136 shifted to the left as shown in Figure 2, conduit 18 is connected to conduit 36 and conduit 58 to conduit 34. In the center position shown in Figure 3, conduit 18 is connected to conduit 58 because of the notches 138 in land 134, and flow of fluid from conduit 36 to conduit 34 is blocked by land 132.

Referring now to Figure 1, in operation, with the electric motor 12 running and operating pump 10 and with handle 136 of valve 26 in the position shown, fluid under pressure will be delivered by pump 10 to delivery conduit 18 and to the pressure port 24 of valve 26 where it will be directed by valve 26 by means of port 30 and conduit 58 to the drain port 56 of valve 48. Pressure fluid entering port 56 enters cylinder 112 where relief valve 114 prevents it from entering passage 126. Pressure fluid in conduit 18 is also delivered by branch conduit 44 to the inlet port 46 of reducing valve 48, enters inlet chamber 100 and by means of passage 104 and port 50 of valve 48 and conduit 52 to the rod end of motor 38. Pressure fluid entering inlet chamber 100 of valve 48 may act on the bottom of piston 94 and the top and bottom of portion 98. Pressure fluid flowing through passage 104 also enters restriction passage 116 where by means of passage 124 it enters chamber 122 and acts on the upper area of piston 94 and also acts against relief valve 114 by means of passage 126.

The ability of valve 48 to act as a pressure-reducing valve depends upon the effective operation of relief valve 114. With valve 26 in the position shown and directing pressure fluid to chamber 112 by means of conduit 58 and port 56, the pressures in chamber 112 and passage 126 are equal and, acting in opposite directions against relief valve 114, counteract each other to permit spring 117 to keep relief valve 114 seated. It follows that, with relief valve 114 inoperative, the pressures existing in inlet chamber 100 and chamber 122 are equal and, because they act on equally effective areas of piston 94 and portion 98, counteract each other permitting spring 106 to completely unseat portion 98 and resulting in wide-open communication between inlet chamber 100 and passage 104. With portion 98 in the wide-open position, full delivery of pump 10 will be directed through valve 48 and conduit 52 to the rod end of motor 38 with the exception of the amount of fluid flowing to tank 16 through valve 64 by means of conduits 60 and 68 which is determined by the amount throttle 72 is originally adjusted to pass. As piston 40 of motor 38 shifts to the left, discharging fluid from the head end of the motor 38 will return to tank by means of conduit 36, valve 26 and conduit 34.

Upon completion of movement of piston 40 to the left, if it is desired to reverse the movement of piston 40, handle 136 of valve 26 is shifted to the left as shown in Figure 2 so as to connect conduit 18 to conduit 36 and conduit 58 to conduit 34.

Referring now to Figures 1 and 2, simultaneously with the delivery of pressure fluid from pump 10 to the head end of motor 38 by means of conduit 18, valve 26 and conduit 36, pressure fluid is also delivered by means of conduit 44, valve 48 and conduit 52 to the rod end of motor 38 and also to flow-regulating valve 64 by means of branch conduit 60. With valve 26 in the position shown in Figure 2, valve 48 is operative as a pressure-reducing valve because chamber 112 of valve 48 is connected directly to tank 16 by means of conduit 58, valve 26 and conduit 34. Pressure fluid entering inlet port 46 of valve 48 will leave the outlet port 50 at a reduced pressure as determined by the setting of spring 117. Pressure fluid entering inlet chamber 100 and flowing through seat 102, passage 104 and through outlet port 50 also acts on relief valve 114 by means of restriction passage 116 and passage 126 and now only has to overcome the resistance of spring 117 because chamber 112 is open to tank 16. When this amount of pressure is reached in passage 126, spring 117 will be overcome, relief valve 114 unseated and a pressure drop across portion 120 will occur in passage 116 which is reflected in chamber 122 creating a greater upward thrust on piston 94. This tends to overcome the resistance of spring 106 and shift portion 98 towards the closed position admitting less fluid from inlet chamber 100 through seat 102 and causing the pressure to drop in passage 104. When the pressure in passage 126 drops slightly below the setting of spring 117, relief valve 114 tends to close. Thus, relief valve 114 continually is in operation to limit the pressure in passage 104 and consequently regulates the pressure fluid flowing through outlet port 50 to the rod end of motor 38 and to flow-regulating valve 64.

It is to be taken for granted that the pressure setting of spring 117 of valve 48 is much less than the amount of pressure necessary to overcome the load resistance imposed upon motor 38. Thus, before a pressure has been built up sufficient to overcome this load resistance to shift piston 40, low pressure fluid from valve 48 has already entered conduit 52 and is flowing through valve 64. Low pressure fluid from valve 48 flowing through flow-regulating valve 64 will cause the same to operate in the well-known manner.

Throttle 72 has been originally adjusted to pass a certain amount of fluid, and this amount of fluid will be maintained uniformly constant because compensating valve 70 is responsive to the pressure drop across throttle 72. Pressures ahead of and beyond throttle 72 react on portion 74 by means of passages 80 and 78 in such a manner that any increase of pressure ahead of throttle 72 in passage 82 tends to move portion 84 to the closed position to admit less fluid, while a decrease of pressure tends to move portion 84 more fully to the open position to admit more fluid, thus maintaining constant the pressure in passage 82 ahead of throttle 72. With throttle 72 having been originally adjusted to pass a certain amount of fluid and with the pressure in passage 82 ahead of throttle 72 remaining constant, the flow of fluid across throttle 72 will remain uniformly constant.

It should be noted that compensating valve 70 when in a normal regulating position is never fully open or fully closed but somewhere between these two extreme positions. Should fluid flow be interrupted through valve 64, spring 88 would shift compensating valve 70 to the full open position.

If piston 40 of motor 38 was stopped and then restarted in a rightward movement, and if compensating valve 70 was in the fully open position, an amount of fluid discharging from the rod end of motor 38 in excess of which throttle 72 is adjusted to pass would pass through the fully open compensating valve 70 before it was able to assume normal regulating position. This would cause motor 38 to jump slightly, i. e., piston 40 would move a short distance faster than normal regulated speed. Thus, it should be noted at this point that, before piston 40 has started to shift rightward, a flow of low pressure fluid from valve 48 has been induced through flow-regulating valve 64, and compensating valve 70 is in a normal regulating position and operating to maintain constant the flow across throttle 72.

Due to the fact that throttle 72 has been adjusted to pass less fluid than total pump delivery output, it offers a restriction to fluid flow which causes an almost immediate pressure increase at port 46 of valve 48, which is also present in conduits 18 and 36, sufficient to overcome the load resistance on motor 38 and start to shift piston 40 to the right. Discharging fluid from motor 38 is prevented from flowing back through valve 48 by check valve 54 and must pass through flow-regulating valve 64 which is connected into the transmission in the manner shown so as to regulate the speed of piston 40 in a rightward movement.

Only a certain regulated amount of fluid is permitted to pass through flow-regulating valve 64, and the balance of pump delivery is exhausted to tank 16 by means of relief valve 20 through conduits 22 and 34. The restriction offered by throttle 72 causes a pressure increase in conduit 52 between motor 38 and check valve 54 which is greater than the pressure in conduit 52 between valve 48 and check valve 54 permitted by reducing valve 48. Consequently, check valve 54 is held to the closed position preventing further flow from pump 10 through valve 48 to flow-regulating valve 64, and discharging fluid from the rod end of motor 38 must flow through conduit 52, valve 64 and conduit 68 to tank 16 resulting in a controlled speed movement of piston 40.

Referring now to Figures 1 and 3, if, during a speed-controlled rightward movement of piston 40, it is desired to stop motor 38, the handle 136 of valve 26 is shifted to the center position as shown in Figure 3. Pressure fluid delivered by pump 10 in conduit 18 will now enter port 24 of valve 26 and, because of the notches 138 in land 134, will be directed through port 30 to conduit 58 where it may enter chamber 112 of reducing valve 48 by means of port 56. Land 132 blocks communication between ports 24 and 28, and the tank port 32 is completely blocked from communication with ports 24, 28 and 30. Pressure fluid from pump 10 flowing in conduit 18 also enters conduit 44 and passes through valve 48 and conduit 52 to the rod end of motor 38, and an amount which throttle 72 has been adjusted to pass flows through flow-regulating valve 64 to tank 16 by means of conduits 60 and 66. Piston 40 is unable to move because of fluid from the head end of motor 38 in conduit 36 being blocked at valve 26 and by the presence of an amount of pressure at the rod end of motor 38 equal to the pressure setting of relief valve 20. Fluid in excess of which is passing over flow-regulating valve 64 is exhausted to tank 16 by means of relief valve 20. Valve 48 is again prevented from acting as a pressure-reducing valve because of fluid pressure being directed to chamber 112 and holding relief valve 114 firmly seated. Full open communication between pump 10, the rod end of motor 38 and flow-regulating valve 64 is thus established. Compensating valve 70 is in a normal regulating position because fluid flow from pump 10 is induced through flow-regulating valve 64.

If it is desired to restart motor 38 and resume shifting piston 40 rightward in a controlled speed movement, the handle 136 of valve 26 is shifted to the left in the position shown in Figure 2, and the speed of piston 40 will again immediately be controlled without jump because compensating valve 70 is in a normal regulating position.

It should be noted that the incorporation of a reducing valve in the manner described in a hydraulic transmission containing a fluid motor and flow-regulating valve for controlling the speed thereof is an efficient, simple and economical method of preventing motor jump when the motor is started after interruption in a regulated movement.

While the form of embodiment of the invention as herein disclosed constitutes a preferred form, it is to be understood that other forms might be adopted, all coming within the scope of the claims which follow.

What is claimed is as follows:

1. In a hydraulic power transmission, the combination of means forming a source of pressure fluid, a fluid motor, a directional valve for selectively directing fluid to and from the motor for either direction of operation thereof and for stopping the motor during operation thereof, a flow-regulating valve for controlling the speed of the motor in one direction of operation and comprising in combination in series in said valve an adjustable throttle and a compensating valve responsive to the pressure drop across said throttle for maintaining a uniformly constant flow through said throttle, said compensating valve being of the type which is fully open when fluid flow through the flow-regulating valve is interrupted, and means comprising a pressure-reducing valve connected to said source of pressure and to the flow-regulating valve for preventing the compensating valve from opening fully when the motor is stopped.

2. In a hydraulic power transmission, the combination of means forming a source of pressure fluid, a fluid motor, a directional valve for selectively directing fluid to and from the motor for either direction of operation thereof and for stopping the motor during operation thereof, a flow-regulating valve for controlling the speed of the motor in one direction of operation, said flow regulating valve having an inlet and an outlet and comprising in combination in series in said valve an adjustable throttle and a compensating valve responsive to the pressure drop across said throttle for maintaining a uniformly constant flow through said throttle, said compensating valve being of the type which is fully open when fluid flow through the flow-regulating valve is interrupted, and means comprising a pressure-reducing valve having an inlet connected to the source of pressure fluid and an outlet connected to the inlet of the flow-regulating valve, said reducing valve providing a flow of pressure fluid through the flow-regulating valve and preventing the compensating valve from opening fully when the motor is stopped.

3. In a hydraulic power transmission, the combination of means forming a source of pressure fluid, a reversible fluid motor, a directional valve for selective operation of the motor in either direction, a flow-regulating valve for causing a regulated movement of the motor in one direction of operation comprising in series in said valve an adjustable throttle and a compensating valve of the type which is fully open when fluid flow through the flow-regulating valve is interrupted, and means connected to the source of pressure fluid and to the flow-regulating valve inducing a flow of low pressure fluid through the flow-regulating valve just before the motor is started in a regulated directional movement for causing the compensating valve to be in normal regulating position when the motor is started in such regulated directional movement.

4. In a hydraulic power transmission, the combination of a fluid pump, a reversible fluid motor, a directional valve for selective operation of the motor in either direction, a flow-regulating valve for controlling the speed of the motor in one direction of operation comprising in series in said valve an adjustable throttle and a compensating valve of the type which is fully open when fluid flow through the flow-regulating valve is interrupted, a reducing valve having an inlet connected to said source of pressure fluid and an outlet connected to the flow-regulating valve providing a flow of low pressure fluid through the flow-regulating valve and causing the compensating valve to be in a normal regulating position when the motor is started in a regulated directional movement, and means controlled by the directional valve for causing said reducing valve to be ineffective when the motor is operated in an opposite unregulated directional movement.

5. In a hydraulic power transmission, the combination of a fluid pump, a reversible fluid motor, a flow-regulating valve for controlling the speed of the motor in one direction comprising in combination in series in said valve an adjustable throttle and a compensating valve of the type which is normally open when flow through the flow-regulating valve is interrupted, control valve means for directing fluid to and from the motor for operating the same and including means for interrupting operation of the motor, a pressure-reducing valve connected to said source of pressure fluid and to the flow-regulating valve for causing the compensating valve to be in a normal regulating position when the motor is started in a regulated movement after interruption, and means causing said reducing valve to be ineffective when the motor is operated in an unregulated directional movement by permitting free flow of pressure fluid through the reducing valve to the motor.

6. In a hydraulic power transmission, the combination of means forming a source of pressure fluid, a reversible fluid motor, a flow-regulating valve for controlling the speed of the motor in one direction of operation comprising in combination in series in said valve an adjustable throttle and a compensating valve of the type which is normally open when flow through the flow-regulating valve is interrupted, control valve means for selectively directing fluid to and from the motor for causing regulated and unregulated directional movements of the motor and including means for stopping the motor, a pressure-reducing valve connected to the source of pressure fluid and to the flow-regulating valve for causing the compensating valve to be in a normal regulating position when the motor is started in a regulated movement after interruption, and means preventing a flow of low pressure fluid from the pressure-reducing valve to the flow-regulating valve when the motor is started in a regulated movement.

7. In a hydraulic power transmission, the combination of means forming a source of pressure fluid, a reversible fluid motor, a flow-regulating valve for controlling the speed of the motor in one direction comprising in combination in series in said valve an adjustable throttle and a compensating valve of the type which is normally open when flow through the flow-regulating valve is interrupted, control valve means for directing fluid to and from the motor for operating the same and including means for interrupting operation of the motor, a pressure-reducing valve connected to the source of pressure fluid and to the flow-regulating valve for causing the compensating valve to be in a normal regulating position when the motor is started in a regulated movement after interruption, means preventing a flow of low pressure fluid from the pressure-reducing valve to the flow-regulating valve when the motor is started in a regulated movement, and means causing said reducing valve to be ineffective when the motor is operated in an unregulated directional movement.

8. In a hydraulic power transmission, the combination of a fluid pump, a reversible fluid motor, a flow-regulating valve for controlling the speed of the motor in one direction comprising in combination in series in said valve an adjustable throttle and a compensating valve of the type which is normally open when flow through the flow-regulating valve is interrupted, a three-position directional valve for selectively operating the motor in both directions and for stopping the motor during a directional movement thereof, a pressure-reducing valve connected to a source of pressure fluid and to the flow-regulating valve, means controlled by the directional valve causing said reducing valve to be effective for providing a flow of low pressure fluid through the flow-regulating valve just before the motor is started in a regulated movement, means controlled by the directional valve causing said reducing valve to be ineffective when the motor is operated in an unregulated directional movement, and means controlled by the directional valve causing a free flow of pressure fluid through the reducing valve to the flow-regulating valve whenever the motor is stopped during a directional movement thereof.

9. In a hydraulic power transmission, the combination of a fluid pump, a reversible fluid motor, a flow-regulating valve for controlling the speed of the motor in one direction comprising in combination in series in said valve an adjustable throttle and a compensating valve of the type which is normally open when flow through the flow-regulating valve is interrupted, a three-position directional valve for selectively operating the motor in both directions and for stopping the motor during a directional movement thereof, a pressure-reducing valve connected to a source of pressure fluid and to the flow-regulating valve, means controlled by the directional valve causing said reducing valve to be effective for providing a flow of low pressure fluid through the flow-regulating valve just before the motor is started in a regulated movement, means between the motor and the reducing valve blocking the flow of low pressure fluid through the reducing valve after the motor is started in a regulated movement, means controlled by the directional valve causing said reducing valve to be ineffective when the motor is operated in an unregulated directional movement, and means controlled by the directional valve causing a free flow of pressure fluid through the reducing valve to the flow-regulating valve whenever the motor is stopped during a directional movement thereof.

10. In a hydraulic power transmission, the combination of means forming a source of pressure fluid, a fluid motor, a flow regulating valve for controlling the speed of the motor comprising an adjustable throttle through which fluid is adapted to flow at a regulated rate and a pressure compensating valve assuming various regulating positions in response to the pressure drop across the throttle for maintaining the pressure drop there-across constant and maintaining the regulated flow rate through the throttle, said compensating valve being of the type which is biased to the open position when flow through the flow regulating valve is interrupted, control valve means for selectively operating and stopping the motor, means connected to said source of pressure fluid and to the flow regulating valve inducing a flow of low pressure fluid through the flow regulating valve before the motor is started in a controlled speed movement, and placing the compensating valve in a regulating position and automatically operated valve means blocking the pressure fluid source from the flow regulating valve when the controlled speed movement of the motor commences.

11. In a hydraulic power transmission, the combination of means forming a source of pressure fluid, a fluid motor, a flow regulating valve for controlling the speed of the motor comprising an adjustable throttle through which fluid is adapted to flow at a regulated rate and a pressure compensating valve assuming various regulating positions in response to the pressure drop across the throttle for maintaining the pressure drop there-across constant and maintaining the regulated flow rate through the throttle, said compensating valve being of the type which is biased to the open position when flow through the flow regulating valve is interrupted, control valve means for selectively operating and stopping the motor, means connected to the source of pressure fluid and to the flow regulating valve inducing a flow of low pressure fluid through the flow regulating valve before the motor is started in a controlled speed movement, and placing the compensating valve in a regulating position, and a check valve between the means and the flow regulating valve for automatically blocking the means from the flow regulating valve when the controlled speed movement of the motor commences.

12. In a hydraulic power transmission, the combination of a fluid pump, a fluid motor, a flow regulating valve for controlling the speed of the motor comprising an adjustable throttle through which fluid is adapted to flow at a regulated rate and a pressure compensating valve assuming various regulating positions in response to the pressure drop across the throttle for maintaining the pressure drop there-across constant and maintaining the regulated flow rate through the throttle, said compensating valve being of the type which is biased to the open position when flow through the flow regulating valve is interrupted, control valve means for selectively operating and interrupting the operation of the motor, means forming a source of low pressure fluid connected to the flow regulating valve placing the compensating valve in a regulating position before the controlled speed movement of the motor commences, and means effectively blocking the low pressure fluid source from the flow regulating valve when the controlled speed movement of the motor commences.

13. In a hydraulic power transmission system, the combination of means forming a source of pressure fluid, a fluid motor, a flow regulating valve for controlling the speed of the motor comprising an adjustable throttle and a pressure compensating valve assuming various regulating positions in response to the pressure drop across the throttle thereby maintaining the pressure drop thereacross constant and the flow through the flow regulating valve regulated, said compensating valve being of the type that is biased to an open position when flow through the flow regulating valve is interrupted, control means for selectively causing controlled speed and uncontrolled speed directional movements of the motor including means for stopping and resuming operation of the motor, means connected to the pressure fluid source and to the flow regulating valve inducing a flow of fluid through the flow regulating valve when the motor is stopped for maintaining the compensating valve in a regulating position and means for causing the flow inducing means to be ineffective when motor operation is resumed after interruption.

ALBERT M. LANE.

REFERENCES CITED

The following references are of record in the file of this patent:

UNITED STATES PATENTS

| Number | Name | Date |
|---|---|---|
| 1,985,443 | Clute | Dec. 25, 1934 |
| 2,328,979 | Herman et al. | Sept. 7, 1943 |

FOREIGN PATENTS

| Number | Country | Date |
|---|---|---|
| 373,732 | Great Britain | June 2, 1932 |